United States Patent
Hou et al.

(10) Patent No.: US 7,177,122 B2
(45) Date of Patent: Feb. 13, 2007

(54) BIASING FOR TRI-LAYER MAGNETORESISTIVE SENSORS

(75) Inventors: Chunhong Hou, Savage, MN (US); Sining Mao, Savage, MN (US); Eric S. Linville, Chanhassen, MN (US); Olle Heinonen, Eden Prairie, MN (US); Xuefei Tang, Eden Prairie, MN (US); Qing He, Plymouth, MN (US); Eric W. Singleton, Maple Plain, MN (US); Song S. Xue, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 301 days.

(21) Appl. No.: 10/694,483

(22) Filed: Oct. 27, 2003

(65) Prior Publication Data

US 2005/0088789 A1 Apr. 28, 2005

(51) Int. Cl.
*G11B 5/33* (2006.01)
(52) U.S. Cl. ................................. 360/324.12
(58) Field of Classification Search ........... 360/324.12, 360/314, 315, 327.2, 327.33, 324.1, 316, 360/327.22, 327.21, 327.24, 324.11; 428/811.2; 324/252
See application file for complete search history.

(56) References Cited

U.S. PATENT DOCUMENTS

| | | | |
|---|---|---|---|
| 5,576,914 A | 11/1996 | Rottmayer et al. | |
| 5,664,316 A | 9/1997 | Chen et al. | |
| 5,736,060 A | 4/1998 | George et al. | |
| 5,737,155 A | 4/1998 | George et al. | |
| 5,739,987 A | 4/1998 | Yuan et al. | |
| 5,739,990 A | 4/1998 | Ravipati et al. | |
| 5,959,809 A * | 9/1999 | Uehara | 360/327.22 |
| 6,005,753 A | 12/1999 | Fontana, Jr. et al. | |
| 6,023,395 A | 2/2000 | Dill et al. | |
| 6,046,891 A * | 4/2000 | Yoda et al. | 360/324.1 |
| 6,087,026 A * | 7/2000 | Kakehi et al. | 428/811.2 |
| 6,114,719 A | 9/2000 | Dill et al. | |
| 6,154,350 A * | 11/2000 | Lee | 360/327.22 |
| 6,255,814 B1 * | 7/2001 | Shimazawa et al. | 324/252 |
| 6,266,218 B1 * | 7/2001 | Carey et al. | 360/324.12 |
| 6,324,037 B1 | 11/2001 | Zhu et al. | |
| 6,353,316 B1 * | 3/2002 | Amano | 324/252 |
| 6,396,734 B2 | 5/2002 | Ishikawa et al. | |
| 6,449,131 B2 * | 9/2002 | Guo et al. | 360/315 |
| 2002/0114111 A1 | 8/2002 | Zhu | |
| 2002/0167768 A1 | 11/2002 | Fontanana, Jr. et al. | |

* cited by examiner

*Primary Examiner*—Tianjie Chen
(74) *Attorney, Agent, or Firm*—Kinney & Lange, P.A.

(57) ABSTRACT

A biasing system for a tri-layer reader stack magnetoresistive sensor is disclosed. The tri-layer reader stack includes a first ferromagnetic free layer, a second ferromagnetic free layer, and a magnetoresistive layer between the first and second ferromagnetic free layers. The free layers are positioned in the tri-layer reader stack such that quiescent state magnetizations of the free layers are antiparallel. A biasing layer is positioned with regard to the tri-layer reader stack, typically separated from the tri-layer reader stack by a nonmagnetic spacer layer. A biasing means is positioned such that a magnetization of the biasing layer is perpendicular to the quiescent state magnetizations of the free layers. This biasing results in the free layers having biased magnetizations directed substantially orthogonal with respect to each other.

26 Claims, 7 Drawing Sheets

BIASING FOR TRI-LAYER MAGNETORESISTIVE SENSORS

BACKGROUND OF THE INVENTION

The present invention relates generally to the field of magnetic data storage and retrieval systems. More particularly, the present invention relates to systems for biasing and stabilizing the free layers of a tri-layer magnetoresistive sensor stack.

In a magnetic data storage and retrieval system, a magnetic recording head typically includes a reader portion having a magnetoresistive (MR) sensor for retrieving magnetically encoded information stored on a magnetic disc. Magnetic flux from the surface of the disc causes rotation of the magnetization vector of a sensing layer or layers of the MR sensor, which in turn causes a change in electrical resistivity of the MR sensor. The sensing layers are often called "free" layers, since the magnetization vectors of the sensing layers are free to rotate in response to external magnetic flux. The change in resistivity of the MR sensor can be detected by passing a current through the MR sensor and measuring a voltage across the MR sensor. External circuitry then converts the voltage information into an appropriate format and manipulates that information as necessary to recover the information encoded on the disc.

MR sensors have been developed that can be characterized in three general categories: (1) anisotropic magnetoresistive (AMR) sensors, (2) giant magnetoresistive (GMR) sensors, including spin valve sensors and multilayer GMR sensors, and (3) tunneling magnetoresistive (TMR) sensors.

AMR sensors generally have a single MR layer formed of a ferromagnetic material. The resistance of the MR layer varies as a function of $\cos^2\alpha$, where $\alpha$ is the angle formed between the magnetization vector of the MR layer and the direction of the sense current flowing in the MR layer.

GMR sensors have a series of alternating magnetic and nonmagnetic layers. The resistance of GMR sensors varies as a function of the spin-dependent transmission of the conduction electrons between the magnetic layers separated by the nonmagnetic layer and the accompanying spin-dependent scattering which takes place at the interface of the magnetic and nonmagnetic layers and within the magnetic layers. The resistance of a GMR sensor depends on the relative orientations of the magnetization in consecutive magnetic layers, and varies as the cosine of the angle between the magnetization vectors of consecutive magnetic layers.

TMR sensors have a configuration similar to GMR sensors, except that the magnetic layers of the sensor are separated by an insulating film thin enough to allow electron tunneling between the magnetic layers. The tunneling probability of an electron incident on the barrier from one magnetic layer depends on the character of the electron wave function and the spin of the electron relative to the magnetization direction in the other magnetic layer. As a consequence, the resistance of the TMR sensor depends on the relative orientations of the magnetization of the magnetic layers, exhibiting a minimum for a configuration in which the magnetizations of the magnetic layers are parallel and a maximum for a configuration in which the magnetizations of the magnetic layers are anti-parallel.

For all types of MR sensors, magnetization rotation occurs in response to magnetic flux from the disc. As the recording density of magnetic discs continues to increase, the width of the tracks on the disc must decrease, which necessitates smaller and smaller MR sensors as well. As MR sensors become smaller in size, particularly for sensors with dimensions less than about 0.1 micrometers ($\mu m$), the sensors have the potential to exhibit an undesirable magnetic response to applied fields from the magnetic disc. MR sensors must be designed in such a manner that even small sensors are free from magnetic noise and provide a signal with adequate amplitude for accurate recovery of the data written on the disc. The present invention is directed to an MR sensor having two free layers with magnetizations biased substantially orthogonally for achieving such performance.

BRIEF SUMMARY OF THE INVENTION

The present invention is a biasing system for a tri-layer magnetoresistive sensor. The tri-layer sensor includes a tri-layer reader stack having a first free layer, a second free layer, and a magnetoresistive/spacer layer between the first and second free layers. Magnetization rotation in the free layers occurs in response to magnetic flux from the disc and a magnetoresistive effect is produced in the magnetoresistive/spacer layer. The free layers are positioned in the tri-layer reader stack such that quiescent state/unbiased magnetizations of the free layers are substantially antiparallel. A biasing means is positioned with respect to the tri-layer reader stack, typically separated from the tri-layer reader stack by a nonmagnetic spacer layer, such that a biasing field is induced on the entire tri-layer reader stack. This biasing results in the free layers having biased magnetizations directed substantially orthogonal with respect to each other.

In one preferred embodiment, a biasing layer is positioned on a top of the tri-layer reader stack separated from the tri-layer reader stack by a nonmagnetic spacer layer. In another preferred embodiment, biasing layers are positioned on a top and a bottom of the tri-layer reader stack, with each bias layer separated from the tri-layer reader stack by a nonmagnetic spacer layer. In yet another preferred embodiment, a magnetic field produced by the sense current biases the tri-layer reader stack. In still another preferred embodiment, permanent magnets, separated from the tri-layer reader stack by nonmagnetic spacers, are positioned on opposite sides of the tri-layer stack. In a further preferred embodiment, soft bias stacks, separated from the tri-layer reader stack by nonmagnetic spacers, are positioned on opposite sides of the tri-layer stack.

DETAILED DESCRIPTION

Figure 1:
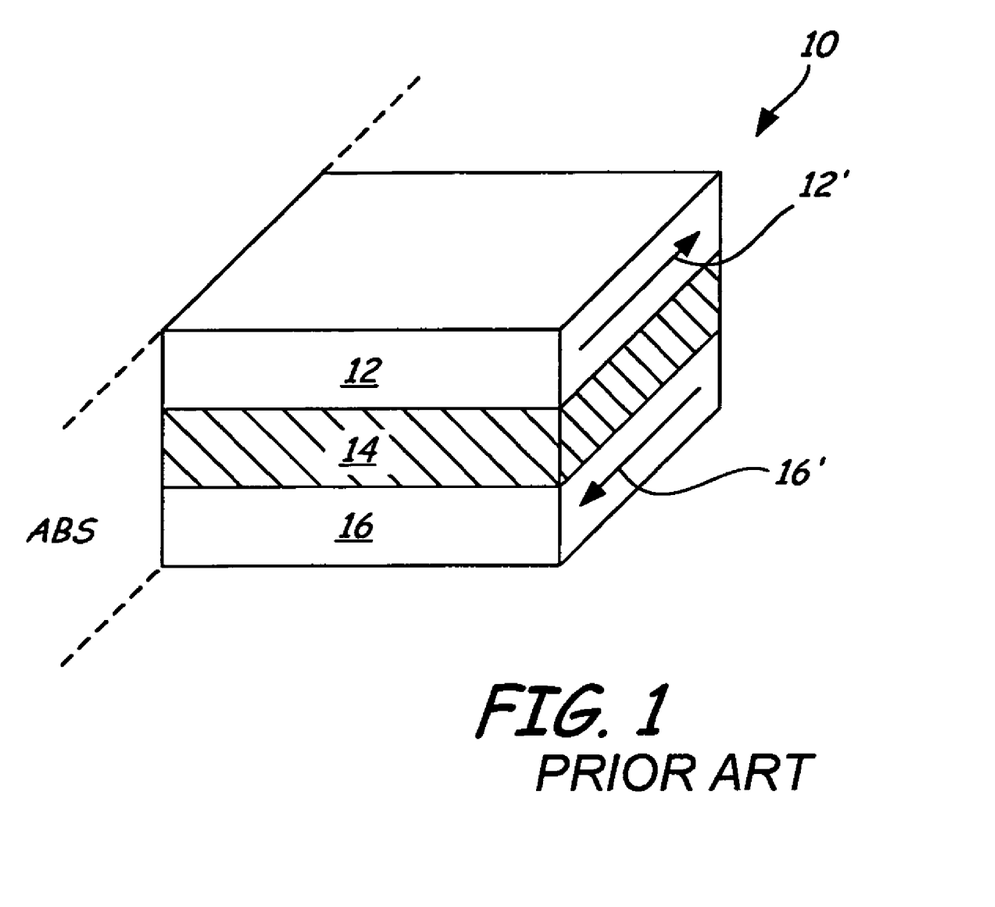
FIG. 1 shows a perspective view of a tri-layer reader stack in a quiescent/unbiased state.

FIG. 1 shows a perspective view of tri-layer reader stack 10 in a quiescent/unbiased state. Tri-layer reader stack 10 includes first free layer 12, magnetoresistive/spacer layer 14, and second free layer 16. Magnetoresistive/spacer layer 14 is positioned between first free layer 12 and second free layer 16. Free layers 12 and 16 are preferably made of a ferromagnetic material. Magnetoresistive/spacer layer 14 may be either a tunnel barrier (to produce a tunneling magnetoresistive, or TMR, effect) or a nonmagnetic conducting spacer (to produce a giant magnetoresistive, or GMR, effect). The quiescent state/unbiased magnetization directions of free layers 12 and 16 are denoted by the arrows 12' and 16', respectively, on each of the free layers.

First free layer 12 and second free layer 16 have shape anisotropy induced magnetization directions. That is, the easy axes of magnetization of first free layer 12 and second free layer 16 in a quiescent/unbiased state point in a direction based on the crystal structure of the material. First free layer 12 is positioned with respect to second free layer 16 in tri-layer reader stack 10 such that the quiescent state/unbiased magnetization directions of the free layers are generally antiparallel with respect to each other. The magnetization directions of free layers 12 and 16 can also be forced antiparallel with respect to one another by, for example, using permanent magnet biasing or incorporating a pinned antiferromagnetic layer. Magnetic alignment between first free layer 12 and second free layer 16 is also modifiable by adjusting the size and shape of the free layers. These modifications can be performed as the particular specifications of tri-layer reader stack 10 and the magnetoresistive read/write head dictate.

For proper operation of tri-layer reader stack 10, the magnetization directions of free layers 12 and 16 must be biased generally orthogonal with respect to one another. This magnetization configuration allows for greater sensitivity and response to flux emanating from the rotating disc, and allows greater control over the magnetic response of the free layers to magnetic fields. Conventionally, the magnetization of first free layer 12 is biased orthogonal to the magnetization of second free layer 16 using a permanent magnet abutting a backside of tri-layer reader stack 10 (see FIGS. 3a and 3b).

Figure 2A:
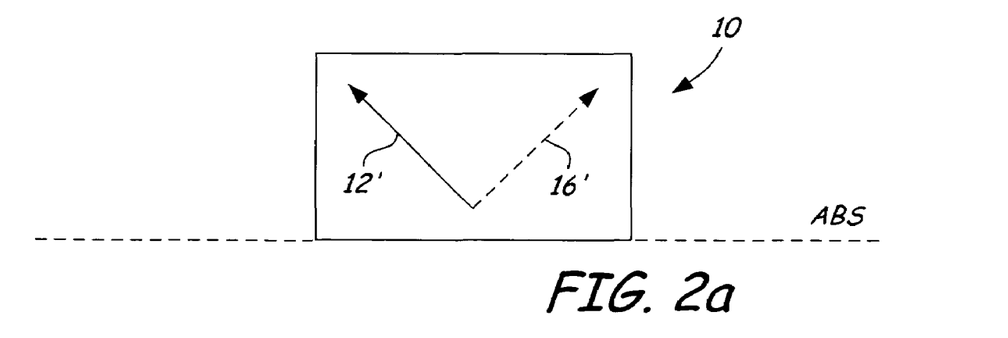
FIG. 2a is a top view of the tri-layer reader stack of FIG. 1 with proper biasing and not under the influence of bit flux.
Figure 2B:
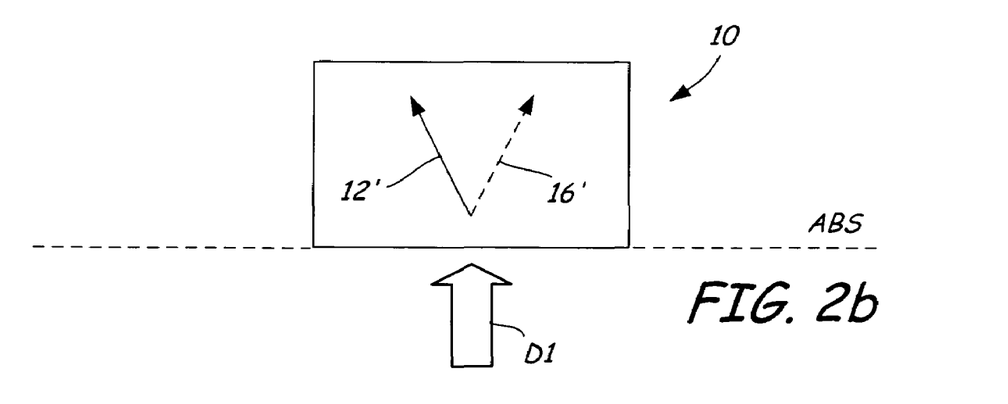
FIG. 2b is a top view of the tri-layer reader stack of FIG. 2a, showing the tri-layer reader stack under the influence of a first state of data.
Figure 2C:
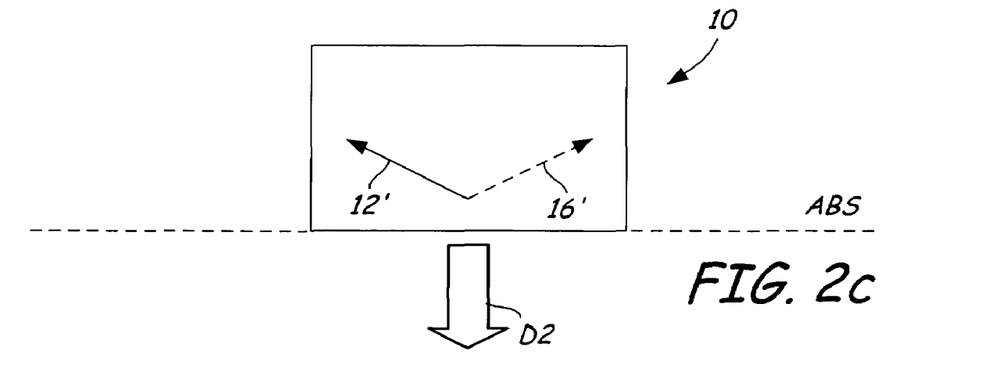
FIG. 2c is a top view of the tri-layer reader stack of FIG. 2a, showing the tri-layer reader stack under the influence of a second state of data.

FIGS. 2a, 2b, and 2c show top views of an tri-layer reader stack 10 with proper biasing, provided to show the effect of varying data states (bit flux) on magnetization directions 12' and 16' of first free layer 12 and second free layer 16, respectively. FIG. 2a shows tri-layer reader stack 10 when it is not under the influence of magnetic flux emanating from the rotating disc. As can be seen, the angle of magnetization between first free layer 12 and second free layer 16 at the ABS is generally orthogonal. FIG. 2b is a top view of tri-layer reader stack 10, showing tri-layer reader stack 10 under the influence of a first state of data $D_1$. This first state of data causes the angle of magnetization between first free layer 12 and second free layer 16 to decrease at the ABS. When this occurs, the resistance across tri-layer reader stack 10 changes and is detected when a sense current is passed through tri-layer reader stack 10. FIG. 2c is a top view of tri-layer reader stack 10, showing tri-layer reader stack 10 under the influence of a second state of data $D_2$. This second state of data causes the angle of magnetization between first free layer 12 and second free layer 16 to increase at the ABS. As with the first state of data, the second state of data causes a change in resistance across tri-layer reader stack 10 and is detected when a sense current is passed through tri-layer reader stack 10.

Figure 3A:
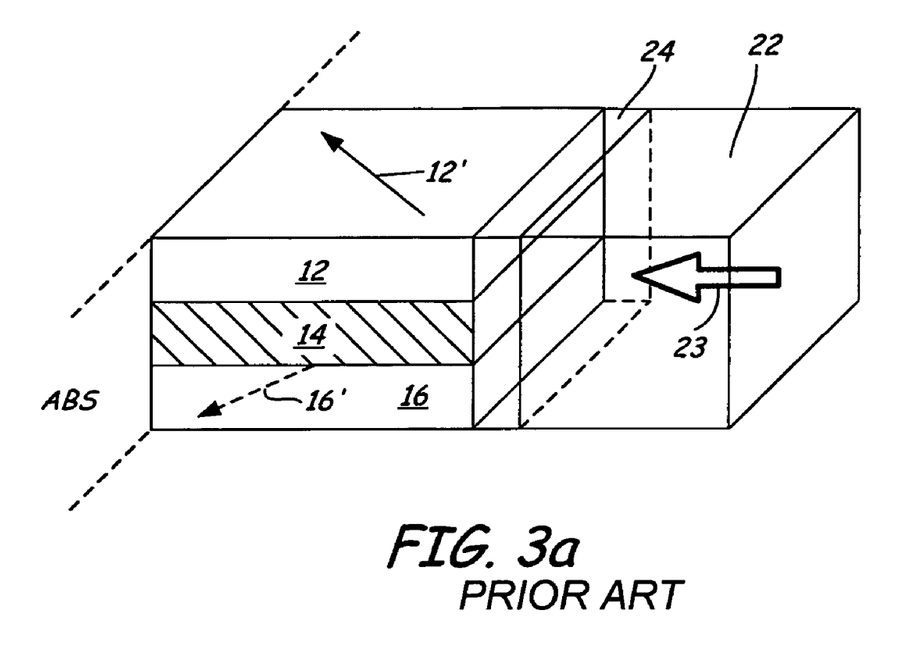
FIG. 3a shows a perspective view of a conventional biasing scheme for a tri-layer reader stack, including a backside permanent magnet to provide the biasing field.
Figure 3B:
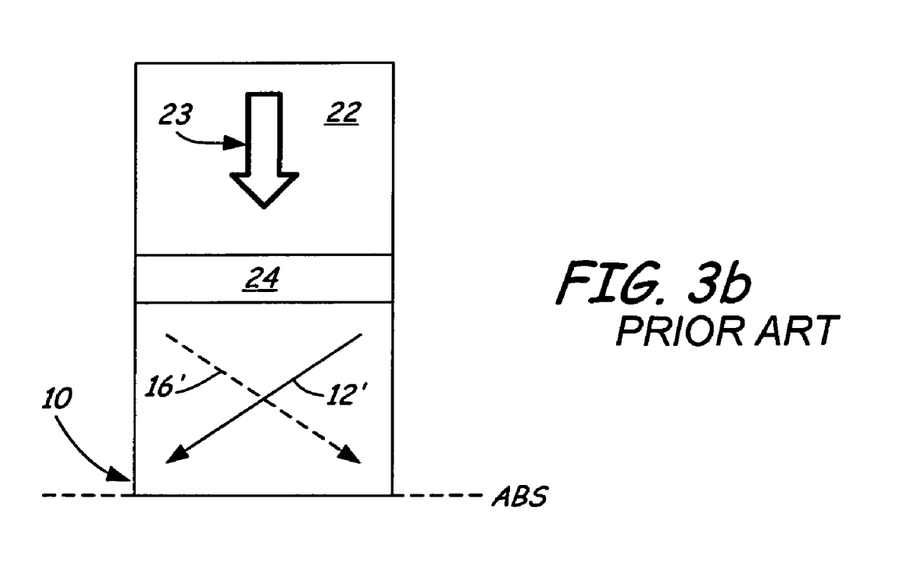
FIG. 3b shows a top view of a conventional biasing scheme for a tri-layer reader stack, including a backside permanent magnet to provide the biasing field.

FIG. 3a shows a perspective view and FIG. 3b shows a top view of a conventional biasing scheme for tri-layer reader stack 10, including backside permanent magnet 22 to provide the biasing field. Permanent magnet 22 is separated from tri-layer reader stack by insulating layer 24. Permanent magnet 22 has fixed magnetization direction denoted by arrow 23 on permanent magnet 22. The biased magnetization directions of free layers 12 and 16 are denoted by arrows 12' and 16', respectively, on each of the free layers.

In operation, a biasing field is needed to bias magnetization 12' of first free layer 12 generally orthogonal with respect to magnetization 16' of free layer 16. This magnetization configuration improves reader sensitivity and results in greater control over the magnetic response of the reader. Positioning of permanent magnet 22 along a back side of tri-layer reader stack 10 (as in FIGS. 3a and 3b) forces the magnetization directions of free layers 12 and 16 to align at an angle with respect to each other. Different angles between the magnetization directions of free layers 12 and 16 can be achieved by positioning permanent magnet 22 at different distances from tri-layer reader stack 10 by altering a thickness of insulating layer 24.

When using this backside biasing scheme, several engineering concerns must be addressed. For example, a proper separation between tri-layer reader stack 10 and permanent magnet 22 must be determined for providing a strong enough field to bias free layers 12 and 16 while sufficiently insulating tri-layer reader stack 10 from permanent magnet 22. That is, the separation between permanent magnet 22 and tri-layer reader stack 10 must be small enough to provide proper biasing strength, but large enough to provide sufficient isolation of tri-layer reader stack 10 from other structures in the magnetic read/write head to prevent stray fields from affecting the performance of the reader portion or the writer portion. These conflicting design goals create difficulties in the engineering of a conventionally biased tri-layer reader stack 10 as in FIGS. 3a and 3b.

Furthermore, because permanent magnet 22 is adjacent only to the back edge of tri-layer reader stack 10, magnetic domains through free layers 12 and 16 will be under inconsistent control. The direction that the magnetization takes within a domain in the absence of an external magnetic field is represented by the easy axes of the particles of the material. Accordingly, while the magnetization directions within the domains near the back edge of free layers 12 and 16 remain under strong control due to the magnetic field produced by permanent magnet 22, the magnetization directions within the domains near the front and side edges of free layers 12 and 16 are only loosely controlled by the magnetic field produced by permanent magnet 22. Thus, the magnetization directions within the domains near the front and side edges of free layers 12 and 16 are partially influenced by the shape anisotropy of the layers. This leads to inconsistent reader performance.

Figure 4:
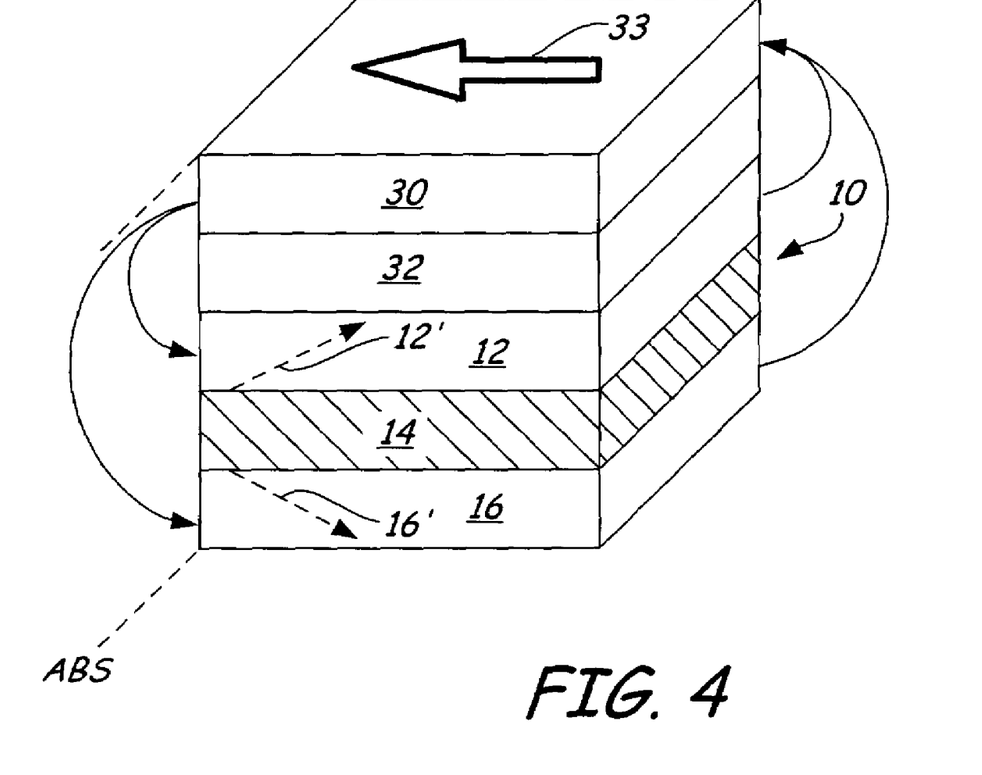
FIG. 4 shows a tri-layer reader stack having an in-stack bias layer to provide a biasing field according to the present invention.

FIG. 4 shows tri-layer reader stack 10 having an in-stack bias layer 30 to provide a biasing field according to one embodiment of the present invention. Bias layer 30 is separated from tri-layer reader stack 10 by nonmagnetic spacer layer 32. Bias layer 30 has a fixed magnetization direction, denoted by arrow 33 on bias layer 30, due to shape anisotropy and the high coercivity of the material which comprises bias layer 30. In a preferred embodiment, bias layer 30 is a permanent magnet made of, for example, CoCrPt, CoPt or CoPt/SiO$_2$. Alternatively, bias layer 30 is a antiferromagnetic (AFM)/ferromagnetic (FM) bilayer structure, wherein the AFM portion is made of, for example, PtMn, PtPdMn, NiMn, IrMn, or NiO, and the FM portion is made of, for example, CoFe. Free layers 12 and 16 are preferably made of a ferromagnetic material with good anisotropy such as NiFeCo or CoFeHf. The biased magnetization directions of free layers 12 and 16 are denoted by arrows 12' and 16', respectively, on each of the free layers.

With bias layer 30 positioned within tri-layer reader stack 10, a biasing field is provided to both the front and the back edges of first free layer 12 and second free layer 16. As shown in FIG. 4, the biasing fields emerge from the air bearing surface (ABS) side of the bias layer 30 and return to the opposite side of bias layer 30 via free layers 12 and 16. Bias layer 30 can be positioned to alter the biasing direction with respect to tri-layer reader stack 10 as design requirements dictate. As with the conventional biasing scheme shown in FIGS. 3a and 3b, appropriate positioning of bias layer 30 relative to tri-layer reader stack 10 forces the magnetization directions of free layers 12 and 16 to align at an angle with respect to each other. Different angles between the magnetization directions of free layers 12 and 16 can be achieved by positioning bias layer 30 at different distances from tri-layer reader stack 10 (e.g., by varying a thickness of nonmagnetic spacer layer 32). Preferably, bias layer 30 is positioned such that magnetization direction 12' of first free layer 12 is biased generally orthogonal with respect to magnetization direction 16' of second free layer 16. Nonmagnetic spacer layer 32 decouples direct exchange coupling between bias layer 30 and first free layer 12. In a preferred embodiment, nonmagnetic spacer layer 32 is made of a material that enhances specular reflection of electrons, for example a metal such as Ag and Au, or a metal oxide such as Al$_2$O$_3$ or Y$_2$O$_3$. If nonmagnetic spacer layer 32 is made of a metal oxide, current shunting through bias layer 30 is eliminated or significantly reduced for current-in-plane (CIP) type sensors. As a result, the sensitivity of the reader will increase. Furthermore, by using a material for nonmagnetic spacer layer 32 that enhances specular reflection of electrons, the magnetoresistive effect produced by magnetoresistive/spacer layer 14 is enhanced, since the mean free path of electrons passing through magnetoresistive/spacer layer 14 is reduced. Specular electron scattering in magnetoresistive devices is discussed in H. J. M. Swagten, G. J. Strijkers, R. H. J. N. Bitter, W. J. M. de Jonge, J. C. S. Kools, *Specular Reflection in Spin Valves Bounded by NiO Layers*, IEEE Transactions on Magnetics, v. 34, No. 4, pp. 948–953 (1998), and is incorporated by reference.

Figure 5:
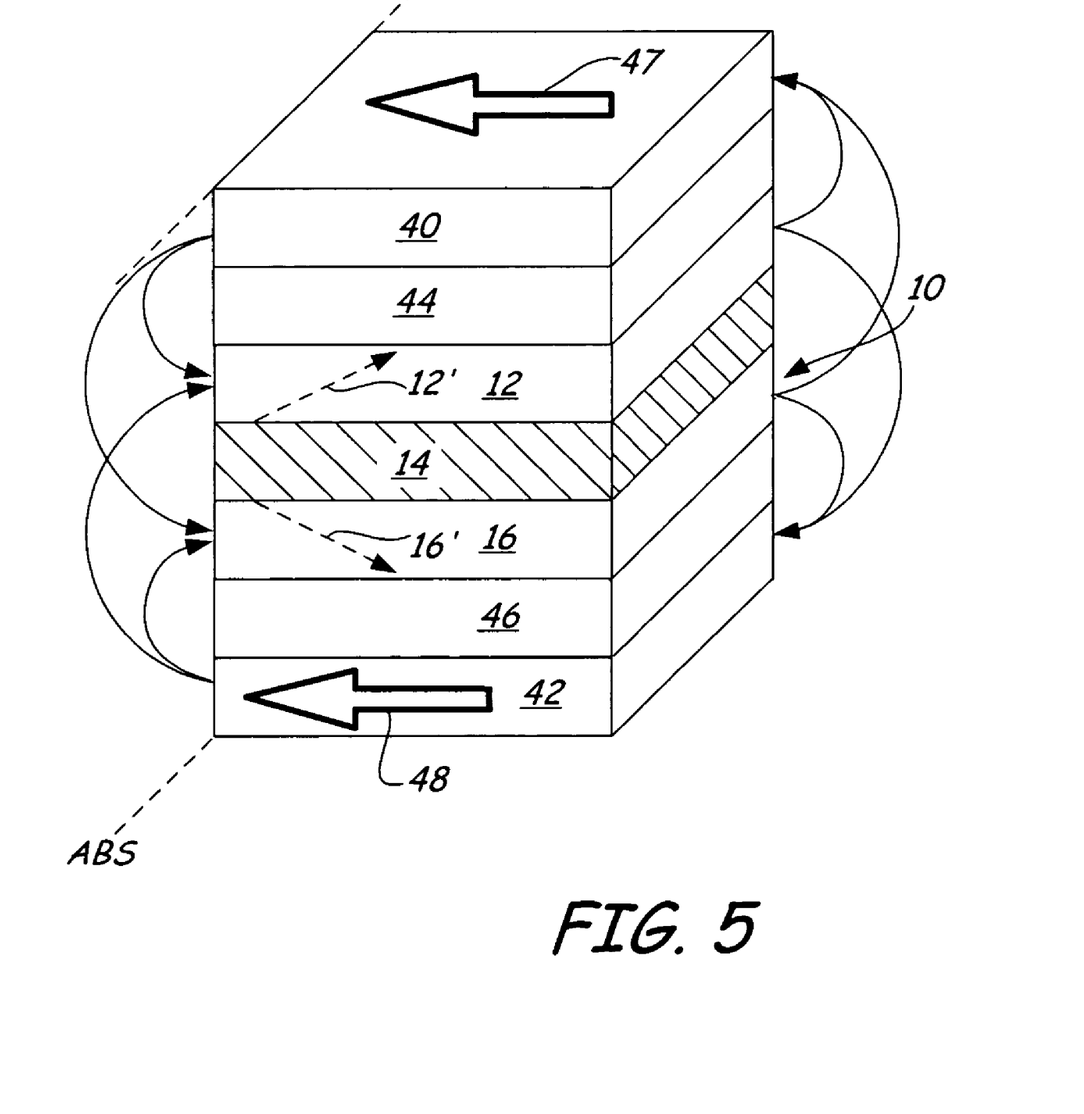
FIG. 5 shows a tri-layer reader stack having two in-stack bias layers to provide a biasing field according to the present invention.

FIG. 5 shows tri-layer reader stack 10 having in-stack bias layers 40 and 42 to provide a biasing field according to another embodiment of the present invention. Bias layers 40 and 42 are separated from tri-layer reader stack 10 by nonmagnetic spacer layers 44 and 46, respectively. Bias layer 40 has a fixed magnetization direction denoted by arrow 47 and bias layer 42 has a fixed magnetization direction denoted by arrow 48. Bias layers 40 and 42 have fixed direction magnetizations due to shape anisotropy and the high coercivity of the material which comprises bias layers 40 and 42. In one preferred embodiment, bias layers 40 and 42 are antiferromagnetic layers made of, for example, PtMn, PtPdMn, NiMn, IrMn, or NiO, which have pinning directions set by annealing the antiferromagnetic layers in a magnetic field. In such a case, bias layers 40 and 42 may alternatively be exchanged coupled in direct contact with free layers 12 and 16, respectively. In another preferred embodiment, bias layers 40 and 42 are permanent magnets made of, for example, CoCrPt. In still another preferred embodiment, bias layers 40 and 42 are antiferromagnetic (AFM)/ferromagnetic (FM) bilayer structures, wherein the AFM portion is made of, for example, PtMn, PtPdMn, NiMn, IrMn, or NiO, and the FM portion is made of, for example, CoFe. The biased magnetization directions of free layers 12 and 16 are denoted by arrows 12' and 16', respectively, on each of the free layers.

With bias layers 40 and 42 positioned within tri-layer reader stack 10, a biasing field is provided to both the front and the back edges of first free layer 12 and second free layer 16. As shown in FIG. 5, the biasing fields emerge from the ABS of bias layers 40 and 42 and return to the opposite side of bias layers 40 and 42 via free layers 12 and 16. Bias layers 40 and 42 can be positioned to alter the biasing direction as reader requirements dictate. As with the conventional biasing scheme shown in FIGS. 3a and 3b and the biasing scheme according to the present invention shown in FIG. 4, appropriate positioning of bias layers 40 and 42 relative to ti-layer reader stack 10 forces the magnetization directions of free layers 12 and 16 to align at an angle with respect to each other. Different angles between the magnetization directions of free layers 12 and 16 can be achieved by positioning bias layers 40 and 42 at different distances from ti-layer reader stack 10 (e.g., by varying a thickness of nonmagnetic spacer layers 44 and 46). Preferably, bias layers 40 and 42 are positioned such that the magnetization direction of first free layer 12 is biased generally orthogonal to the magnetization direction of second free layer 16. Nonmagnetic spacer layer 44 decouples direct exchange coupling between bias layer 40 and first free layer 12, and nonmagnetic spacer layer 46 decouples direct exchange coupling between bias layer 42 and second free layer 16. In a preferred embodiment, nonmagnetic spacer layers 44 and 46 are made of a material that enhances specular reflection of electrons, for example a metal such as Ag and Au, or a metal oxide such as Al$_2$O$_3$ or Y$_2$O$_3$. If nonmagnetic spacer layers 44 and 46 are made of a metal oxide, current shunting through bias layer 40 is eliminated or significantly reduced for current-in-plane (CIP) type sensors. As a result, the sensitivity of the reader will increase. Furthermore, by using a material for nonmagnetic spacer layers 44 and 46 that enhances specular reflection of electrons, the magnetoresistive effect produced by magnetoresistive/spacer layer 14 is enhanced, since the mean free path of electrons passing through magnetoresistive/spacer layer 14 is reduced.

Figure 6:
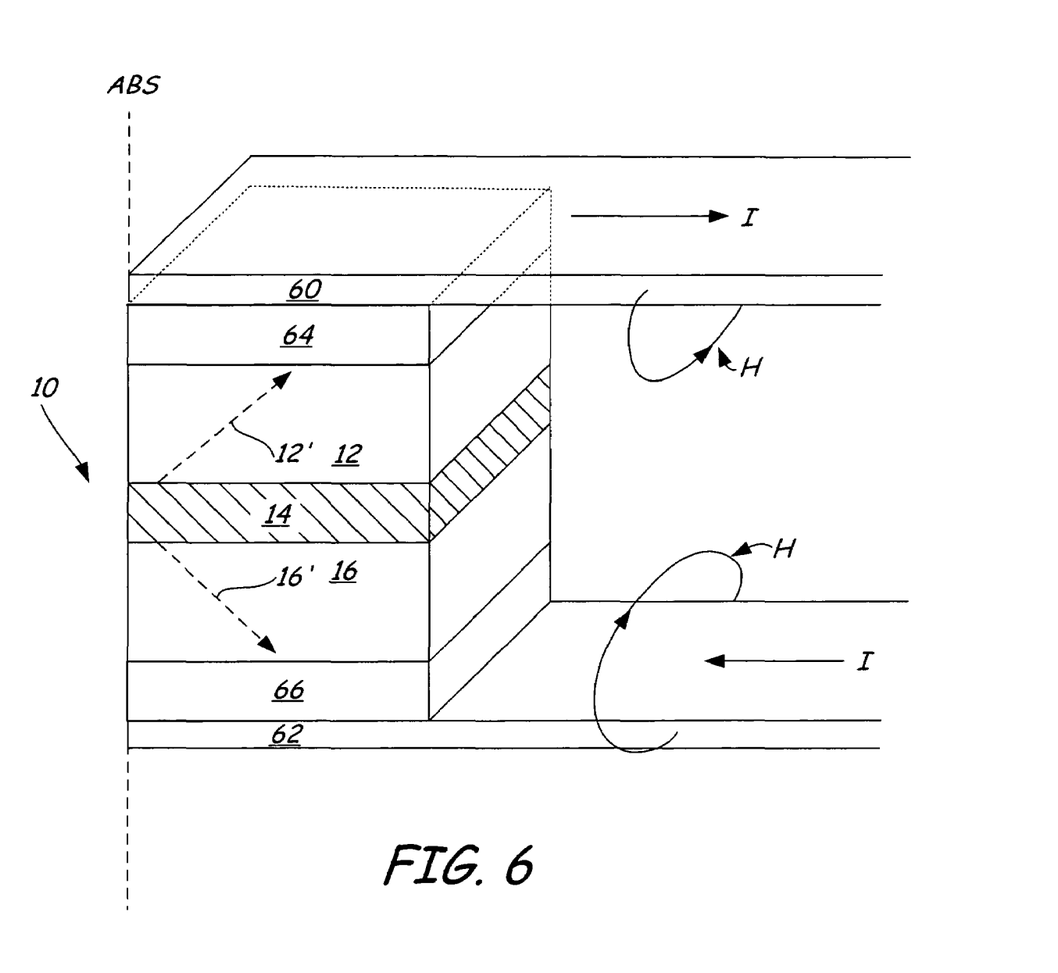
FIG. 6 shows a tri-layer reader stack having a magnetic field produced by sense current I to provide a biasing field according to another embodiment of the present invention.

FIG. 6 shows tri-layer reader stack 10 having magnetic fields H produced by sense current I to provide a biasing field according to another embodiment of the present invention. Sense current leads 60 and 62 are connected to tri-layer reader stack 10 via cap layer 64 and seed layer 66, respectively. Sense current I is passed through sense current leads 60 and 62 and tri-layer reader stack 10 to detect a change in resistivity of the MR sensor (in conjunction with external circuitry as described above and not shown in FIG. 6). As sense current I passes through sense current leads 60 and 62, magnetic fields H are produced around sense current leads 60 and 62. Magnetic fields H bias free layers 12 and 16 such that magnetizations 12' and 16' of first free layer 12 and second free layer 16 rotate from their quiescent/unbiased antiparallel state.

With sense current leads 60 and 62 positioned above and below tri-layer reader stack 10, a biasing field is provided to both the front and back edges of first free layer 12 and second free layer 16. Additional insulating layers can be positioned between sense current leads 60 and 62 and tri-layer reader 10 to alter the biasing effect magnetic fields H have on free layers 12 and 16. Appropriate positioning of sense current leads 60 and 62 relative to tri-layer reader stack 10 forces the magnetization directions of free layers 12 and 16 to align at an angle with respect to each other. Different angles between the magnetization directions of free layers 12 and 16 can be achieved by, for example, positioning sense current leads 60 and 62 at different distances from tri-layer reader stack 10 or by varying the magnitude of sense current I. Preferably, sense current leads 60 and 62 and sense current I are configured such that the magnetization direction of first free layer 12 is biased generally orthogonal to the magnetization direction of second free layer 16.

Figure 7:
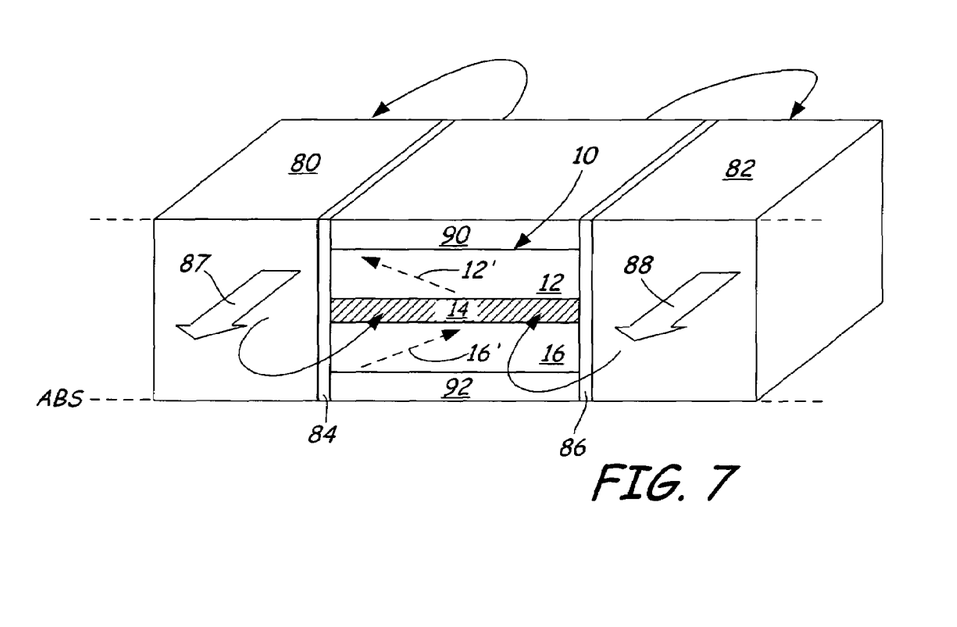
FIG. 7 is a perspective air bearing surface view of a tri-layer reader stack having bias layers positioned on opposite sides of the tri-layer reader stack to provide a biasing field according to another embodiment of the present invention.

FIG. 7 shows a perspective air bearing surface view of tri-layer reader stack 10 having bias layers 80 and 82 positioned on opposite sides of tri-layer reader stack 10 to provide a biasing field according to another embodiment of the present invention. Bias layers 80 and 82 are separated from tri-layer reader stack 10 by nonmagnetic spacer layers 84 and 86, respectively. Bias layer 80 has a fixed magnetization direction denoted by arrow 87 and bias layer 82 has a fixed magnetization direction denoted by arrow 88. Cap layer 90 and seed layer 92 are positioned on a top and a bottom, respectively, of tri-layer reader stack 10. Bias layers 80 and 82 have fixed direction magnetizations due to shape anisotropy and the high coercivity of the material which comprises bias layers 80 and 82. In one preferred embodiment, bias layers 80 and 82 are permanent magnets made of, for example, CoCrPt. In another preferred embodiment, bias layers 80 and 82 are permanent magnets made of a resistive or insulating material, such as a CoPt/SiO$_2$ composite. In both preferred embodiments, bias layers 80 and 82 must have a low remnant magnetization ($M_r$) to avoid erasure of data on the magnetic media due to stray fields from bias layers 80 and 82 at the ABS. The biased magnetization directions of free layers 12 and 16 are denoted by arrows 12' and 16', respectively, on each of the free layers.

With bias layers 80 and 82 positioned on opposite sides of tri-layer reader stack 10, a biasing field is provided to both the front and the back edges of first free layer 12 and second free layer 16. As shown in FIG. 7, the biasing fields emerge from the ABS of bias layers 80 and 82 and pass though tri-layer reader stack 10 (thereby biasing free layers 12 and 16). Bias layers 80 and 82 can be positioned to alter the biasing direction as reader requirements dictate. Appropriate positioning of bias layers 80 and 82 relative to tri-layer reader stack 10 forces the magnetization directions of free layers 12 and 16 to align at an angle with respect to each other. Different angles between the magnetization directions of free layers 12 and 16 can be achieved by positioning bias layers 80 and 82 at different distances from tri-layer reader stack 10 (e.g., by varying a thickness of nonmagnetic spacer layers 84 and 86). Preferably, bias layers 80 and 82 are positioned such that the magnetization direction of first free layer 12 is biased generally orthogonal to the magnetization direction of second free layer 16.

Figure 8:
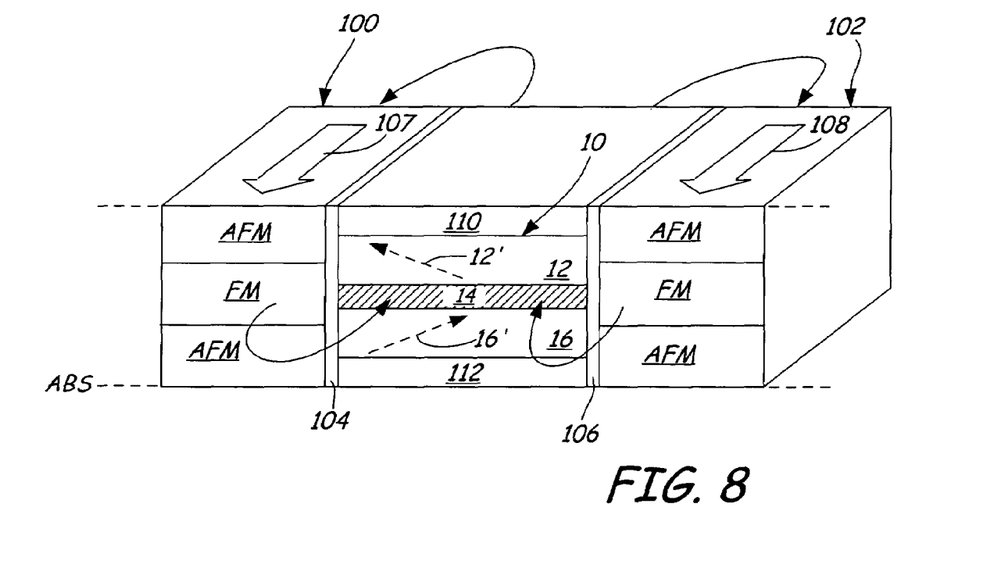
FIG. 8 shows a perspective air bearing surface view of a tri-layer reader stack having soft bias stacks positioned on opposite sides of the tri-layer reader stack to provide a biasing field according to another embodiment of the present invention.

FIG. 8 shows a perspective air bearing surface view of tri-layer reader stack 10 having soft bias stacks 100 and 102 positioned on opposite sides of tri-layer reader stack 10 to provide a biasing field according to another embodiment of the present invention. Bias stacks 100 and 102 are separated from tri-layer reader stack 10 by nonmagnetic spacer layers 104 and 106, respectively. Bias stacks 100 and 102 include an antiferromagnetic (AFM)/ferromagnetic (FM)/AFM layer configuration, for example IrMn/CoFe/IrMn stacks. Alternatively, for further protection against accidental erasure of data on the magnetic medium by the biasing fields produced by bias stacks 100 and 102, the AFM layers of bias stacks 100 and 102 may be made of an oxide, such as NiO or Fe$_3$O$_4$, and the FM layers of bias stacks 100 and 102 may be made of a resistive soft magnetic layer, such as Fe$_2$O$_3$ or a CoFe/HfO composite. Bias stack 100 has a fixed magnetization direction denoted by arrow 107 and bias stack 102 has a fixed magnetization direction denoted by arrow 108. Cap layer 110 and seed layer 112 are positioned on a top and a bottom, respectively, of tri-layer reader stack 10. The biased magnetization directions of free layers 12 and 16 are denoted by arrows 12' and 16', respectively, on each of the free layers.

With bias stacks 100 and 102 positioned on opposite sides of tri-layer reader stack 10, a biasing field is provided to both the front and the back edges of first free layer 12 and second free layer 16. As shown in FIG. 8, the biasing fields emerge from the ABS of bias stacks 100 and 102 and pass though tri-layer reader stack 10 (thereby biasing free layers 12 and 16). Bias stacks 100 and 102 can be positioned to alter the biasing direction as reader requirements dictate. Appropriate positioning of bias stacks 100 and 102 relative to tri-layer reader stack 10 forces the magnetization directions of free layers 12 and 16 to align at an angle with respect to each other. Different angles between the magnetization directions of free layers 12 and 16 can be achieved by positioning bias stacks 100 and 102 at different distances from tri-layer reader stack 10 (e.g., by varying a thickness of nonmagnetic spacer layers 84 and 86). Preferably, bias stacks 100 and 102 are positioned such that the magnetization direction of first free layer 12 is biased generally orthogonal to the magnetization direction of second free layer 16.

The biasing systems of the present invention offer several advantages over conventional biasing systems. For example, the separation of the bias layer(s) from tri-layer reader stack 10 can be readily varied (by varying the thickness of the nonmagnetic spacer layer that separates each bias layer from tri-layer reader stack 10, for example) to provide the desired biasing field strength and magnetic alignment between free layers 12 and 16 without other design constraints, such as isolating the biasing layer from the remainder of the magnetic read/write head structure. Also, both the front edge and the back edge of free layers 12 and 16 are subject to the biasing field produced by the bias layer(s). This allows for greater control over the magnetic domains throughout free layers 12 and 16, thereby offering more control over the magnetic alignment between the two free layers and hysteresis-free magnetization reversal of the free layers.

To summarize, the present invention is a biasing system for a tri-layer reader stack magnetoresistive sensor to provide a biasing field to the entire tri-layer reader stack. The tri-layer reader stack includes a first free layer, a second free layer, and a magnetoresistive/spacer layer between the first and second free layers. Magnetization rotation in the free layers occurs in response to magnetic flux from the disc and a magnetoresistive effect is produced in the nonmagnetic layer. The free layers are positioned in the tri-layer reader stack such that quiescent state/unbiased magnetizations of the free layers are substantially antiparallel. A biasing structure is positioned with respect to the tri-layer reader stack, typically separated from the tri-layer reader stack by a nonmagnetic spacer layer. The biasing structure produces a biasing field through the tri-layer reader stack. This biasing results in the free layers having biased magnetizations directed at an angle with respect to each other, preferably generally orthogonal.

Although the present invention has been described with reference to preferred embodiments, workers skilled in the art will recognize that changes may be made in form and detail without departing from the spirit and scope of the invention.

The invention claimed is:

1. A magnetoresistive sensor comprising:
    a tri-layer reader stack including a first ferromagnetic layer, a second ferromagnetic layer, and a magnetoresistive layer positioned therebetween; and
    biasing means positioned with respect to the tri-layer reader stack and proximate to a medium confronting surface of the magnetoresistive sensor for biasing a magnetization of the first ferromagnetic layer substantially orthogonal to a magnetization of the second ferromagnetic layer.

2. The magnetoresistive sensor of claim 1, further comprising:
    nonmagnetic spacer means positioned between the tri-layer stack and the biasing means.

3. The magnetoresistive sensor of claim 2, wherein the nonmagnetic spacer means is made of a material which enhances specular electron scattering.

4. The magnetoresistive sensor of claim 1, wherein the magnetization of the first ferromagnetic layer is antiparallel to the magnetization of the second ferromagnetic layer in a quiescent state.

5. The magnetoresistive sensor of claim 4, wherein the quiescent state magnetization of the first and second ferromagnetic layers are antiparallel due to shape anisotropy.

6. The magnetoresistive sensor of claim 4, wherein a biasing direction of the biasing means is generally perpendicular to the magnetization of the first and second ferromagnetic layers in the quiescent state.

7. The magnetoresistive sensor of claim 1, wherein the magnetization of the first ferromagnetic layer and the magnetization of the second ferromagnetic layer rotate in response to flux emanated from a rotating disc.

8. The magnetoresistive sensor of claim 1, wherein the biasing means is at least one permanent magnet layer having a shape anisotropy induced magnetization direction.

9. The magnetoresistive sensor of claim 1, wherein the biasing means is at least one permanent magnet layer comprising a high coercivity ferromagnetic material.

10. The magnetoresistive sensor of claim 1, wherein the biasing means is a layer of antiferromagnetic material.

11. The magnetoresistive sensor of claim 1, wherein the biasing means is a bilayer including a layer of antiferromagnetic material and a layer of ferromagnetic material.

12. The magnetoresistive sensor of claim 1, wherein the biasing means produces a sense current induced magnetic field.

13. The magnetoresistive sensor of claim 1, wherein the biasing means is an antiferromagnetic/ferromagnetic/antiferromagnetic stack.

14. The magnetoresistive sensor of claim 1, wherein the magnetoresistive layer is a nonmagnetic metal.

15. The magnetoresistive sensor of claim 1, wherein the magnetoresistive layer is a tunnel barrier.

16. A magnetoresistive sensor comprising:
    a first ferromagnetic free layer;
    a second ferromagnetic free layer having a quiescent state magnetization substantially antiparallel to a quiescent state magnetization of the first ferromagnetic free layer;
    a magnetoresistive layer located between the first and second ferromagnetic free layers; and
    at least one biasing structure positioned with respect to the first and second ferromagnetic free layers and proximate to a medium confronting surface of the magnetoresistive sensor to bias a magnetization of the first ferromagnetic free layer substantially orthogonal to a magnetization of the second ferromagnetic free layer.

17. The magnetoresistive sensor of claim 16, wherein the at least one biasing structure is a permanent magnet.

18. The magnetoresistive sensor of claim 17, wherein the permanent magnet is made of a material selected from the group consisting of CoCrPt, CoPt and a CoPt/SiO$_2$ composite.

19. The magnetoresistive sensor of claim 16, wherein the at least one biasing structure is a soft bias antiferromagnetic/ferromagnetic/antiferromagnetic multilayer structure.

20. The magnetoresistive sensor of claim 19, wherein the antiferromagnetic layers are made of a material selected from the group consisting of IrMn, NiO, and Fe$_3$O$_4$, and wherein the ferromagnetic layer is made of a material selected from the group consisting of CoFe, Fe$_2$O$_3$, and a CoFe/HfO composite.

21. The magnetoresistive sensor of claim 16, wherein a magnetization of the at least one biasing structure is generally perpendicular to the quiescent state magnetization of the first and second ferromagnetic free layers.

22. The magnetoresistive sensor of claim 16, wherein the magnetization of the first ferromagnetic free layer and the magnetization of the second ferromagnetic free layer rotate in response to external magnetic flux.

23. The magnetoresistive sensor of claim 16, wherein the magnetoresistive layer is a metal.

24. The magnetoresistive sensor of claim 16, wherein the magnetoresistive layer is a tunnel barrier.

25. The magnetoresistive sensor of claim 16, wherein the at least one biasing structure is separated from the first and second ferromagnetic free layers by a nonmagnetic spacer layer.

26. The magnetoresistive sensor of claim 25, wherein the nonmagnetic spacer layer is made of a material which enhances specular electron scattering.

* * * * *